US007904563B2

(12) United States Patent
Stoyanov et al.

(10) Patent No.: US 7,904,563 B2
(45) Date of Patent: Mar. 8, 2011

(54) ESTABLISHING AND UTILIZING TERMINAL SERVER DYNAMIC VIRTUAL CHANNELS

(75) Inventors: Vladimir K. Stoyanov, Redmond, WA (US); Makarand V. Patwardhan, Redmond, WA (US); Mahesh S. Lotlikar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1377 days.

(21) Appl. No.: 11/395,553

(22) Filed: Mar. 31, 2006

(65) Prior Publication Data

US 2007/0244966 A1    Oct. 18, 2007

(51) Int. Cl.
G06F 15/16    (2006.01)
(52) U.S. Cl. ......... 709/227; 709/204; 709/205; 709/203; 709/219; 709/228; 709/238
(58) Field of Classification Search .................. 709/220, 709/231, 228, 204, 205, 203, 219, 227, 229, 709/238; 395/200.57, 681, 200.6
See application file for complete search history.

(56) References Cited

U.S. PATENT DOCUMENTS

| | | | | |
|---|---|---|---|---|
| 5,867,661 | A * | 2/1999 | Bittinger et al. | 709/227 |
| 5,956,322 | A | 9/1999 | Charny | |
| 6,273,622 | B1 | 8/2001 | Ben-David | |
| 6,304,574 | B1 | 10/2001 | Schoo et al. | |
| 6,643,690 | B2 * | 11/2003 | Duursma et al. | 709/217 |
| 6,785,713 | B1 * | 8/2004 | Freeman et al. | 709/208 |
| 6,785,726 | B1 * | 8/2004 | Freeman et al. | 709/227 |
| 7,502,726 | B2 * | 3/2009 | Panasyuk et al. | 703/22 |
| 7,555,529 | B2 * | 6/2009 | Bloomfield et al. | 709/217 |
| 7,562,146 | B2 * | 7/2009 | Panasyuk et al. | 709/227 |
| 7,702,750 | B2 * | 4/2010 | Momtchilov et al. | 709/219 |
| 7,712,110 | B2 * | 5/2010 | Gulkis | 719/328 |
| 2002/0198965 | A1 | 12/2002 | Kraft | |
| 2003/0026267 | A1 | 2/2003 | Oberman et al. | |

(Continued)

FOREIGN PATENT DOCUMENTS

WO    WO 01/67672 A3    9/2001

OTHER PUBLICATIONS

S. Jae Yang, Jason Nieh, Matt Selsky, and Nihkil Tiwari USENIX 2002 Annual Technical Conference Paper "The Performance of Remote Display Mechanisms for Thin-Client Computing", 28 pages, Originally published in the Proceedings of the 2002 USENIX Annual Technical Conference Jun. 10-15, 2002 http://www.usenix.org/publications/library/proceedings/usenix02/full_papers/yang/yang_html/.

(Continued)

*Primary Examiner* — Dohm Chankong
(74) *Attorney, Agent, or Firm* — Workman Nydegger

(57) ABSTRACT

The present invention extends to methods, systems, and computer program products for establishing and utilizing terminal server dynamic virtual channels. In some embodiments, a terminal server sends a new channel request to a terminal server. The client receives the new channel request and forwards the new channel request to a listener for a plug-in. The listener creates an instance of the client side plug-in and sends a channel accept to the terminal server. The terminal server receives the channel accept and creates an instance of a server side plug-in. The server and the client agree to use a unique identifier for identifying the established dynamic virtual channel. In other embodiments, data for a dynamic virtual channel is tunneled between computers over a static virtual channel.

17 Claims, 6 Drawing Sheets

U.S. PATENT DOCUMENTS

| | | | |
|---|---|---|---|
| 2004/0010560 A1* | 1/2004 | Sandage et al. | 709/208 |
| 2004/0250130 A1 | 12/2004 | Billharz et al. | |
| 2005/0021687 A1* | 1/2005 | Anastassopoulos et al. | 709/220 |
| 2005/0080907 A1 | 4/2005 | Panasyuk et al. | |
| 2005/0125560 A1 | 6/2005 | Brockway et al. | |
| 2005/0267972 A1 | 12/2005 | Costa-Requena et al. | |
| 2005/0267974 A1* | 12/2005 | Panasyuk et al. | 709/228 |
| 2006/0069750 A1* | 3/2006 | Momtchilov et al. | 709/219 |
| 2006/0075123 A1* | 4/2006 | Burr et al. | 709/228 |
| 2007/0171921 A1* | 7/2007 | Wookey et al. | 370/401 |
| 2007/0174410 A1* | 7/2007 | Croft et al. | 709/208 |
| 2007/0174429 A1* | 7/2007 | Mazzaferri et al. | 709/218 |
| 2007/0180448 A1* | 8/2007 | Low et al. | 718/1 |
| 2007/0186212 A1* | 8/2007 | Mazzaferri et al. | 718/1 |
| 2007/0198656 A1* | 8/2007 | Mazzaferri et al. | 709/218 |

OTHER PUBLICATIONS

Alexander Ya-li Wong, Margo Seltzer USENIX Paper—Proceedings of the $3^{rd}$ USENIX Windows NT Symposium, Jul. 12-15, 1999, Seattle, Washington "Evaluating Windows NT Terminal Server Performance", 14 pages Originally published in the Proceedings of the $3^{rd}$ USENIX Windows NT Symposium Jul. 12-15, 1999 https://db.usenix.org/publications/library/proceedings/usenix-nt99/full_papers/wong/wong_html.

F. Silla, J. Duato, A. Sivasubramaniam, C.R. Das "Virtual Channel Multiplexing in Networks of Workstations with Irregular Topology", 8 pages http://csdl2.computer.org/persagen/DLAbsToc.jsp?resourcePath=/dl/proceedings/&toc=comp/proceedings/hipc/1998/9194/00/9194toc.xml&DOI=10.1109/HIPC.1998.737983.

\* cited by examiner

| Events \ States | Initialized | Opening | Open | Closing | Closed |
|---|---|---|---|---|---|
| CreateFile | Opening / Send Open Packet | N/A | N/A | N/A | N/A |
| WriteFile Or Data | N/A | N/A | OK | N/A | N/A |
| CloseFile | N/A | Closing / Send Close Packet | Closing / Send Close Packet | N/A | N/A |
| Open Packet Success | N/A | Open | N/A | Ignored | Ignored |
| Open Packet Fail | N/A | Closed | N/A | Ignored | Ignored |
| Close Packet | N/A | N/A | Closing | Closed | N/A |

Fig. 4

ESTABLISHING AND UTILIZING TERMINAL SERVER DYNAMIC VIRTUAL CHANNELS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

In many environments, a single computer user has multiple computing devices they use to perform computing tasks. For example, a corporate employee may have a work computer, a home computer, and a laptop. Each of these computer systems may be in and may move between different physical locations. For example, the work computer may be in a corporate building, the home computer may be in the employee's home, and the laptop may be in various different locations as the employee travels. However, the employee may desire uniform access to work related applications and work related data from any of their computer systems in any location.

Thus, it may be that all the applications installed at the work computer are also installed on the home computer and on the laptop. Installing the same applications on all of the employee's computer systems can provide a common look and feel across all the computer systems. Installing the same applications on all the employee's computer systems can also provide access to corporate applications and corporate data access in a uniform fashion across all of the computer systems. However, installing the same application on multiple computer systems also has a number of drawbacks.

A corporation supporting the applications may be required to have a license for each version of an application that is installed. Thus, if a computer user has three computer systems, the corporation is required, at least for some applications, to buy three licensed copies of the application. Additional license must be purchased even if some versions of an application (e.g., on a home computer) are used infrequently. Purchasing additional licenses increases the cost of providing employees with uniform access to corporate applications and corporate data.

Further, a corporation may have limited, if any, control over one or more of the employee's computer systems. For example, a corporation may have limited control over an employee's laptop (even if the laptop is corporate property), since the laptop may be used in various different physical locations (e.g., hotels, airports, etc.) at the discretion of the employee. A corporation may have essentially no control over an employee's home computer system, since the home computer system is in the employee's home. Thus, there is no way to insure that corporate security mechanisms (e.g., firewalls, SPAM filters, virus scanners, etc.) are used to protect one or more of an employee's computer systems, when those one or more computer systems access corporate applications and corporate data. Lack of access to corporate security mechanisms is problematic since a security breach to a non-corporate application or non-corporate data can be propagated corporate applications and data. For example, a virus received in a personal e-mail at a home computer system can be propagated to corporate data when the corporate data is subsequently accessed at the home computer system.

Due at last in part to these cost and security concerns, many corporations (as well as other entities) use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP") and Independent Computing Architecture ("ICA")) to an application at the terminal server. The application processes the input as if the input was entered at the terminal server. The application generates output in response to the received input and the output is transferred over the network (e.g., also T.120 based protocols) to the client computer system. The client computer system presents the output data. Thus, input is received and output presented at the client computer system, while processing actually occurs at the terminal server.

In most, if not all terminal server environments, input data (entered at a client computer system) typically includes mouse and keyboard data representing commands to an application and output data (generated by an application at the terminal server) typically includes video data for display on a video output device. Many terminal server environments also include functionality that extends underlying terminal server protocols to transfer other types of customized data.

For example, virtual channels are custom data formats handled independently of RDP or ICA. Virtual channels allow third parties to add new features without having to the underlying terminal server protocols. A virtual channel application includes a client-side component (e.g., a plug-in) and server-side component that can used to transfer customized data over a terminal server connection.

Many such extensions exist. For example, features such as printer redirection, clipboard redirection, port redirection, etc., use virtual channel technology. Thus, in addition to input and output data, there may be many virtual channels transferring data over a terminal server connection.

However, virtual channels have a number of limitations. In many environments, the number of virtual channels per connection (e.g., RDP session) is limited to a fixed number (e.g., 30). As the number third party applications increases, this limit can prevent additional functionality form being added.

Further, client-side and server-side portions of virtual channels typical connect within the context of a specified channel name. Thus, when multiple instances of the same virtual channel are started on the server side, it is difficult, if not impossible, for the client side to distinguish between the different instances (since each instance connects in the context of the same specified channel name). Thus, multiple instances of a virtual channel with the same end point name can typically not be created and in some environments are prevented to avoid errors. This results in a one-to-one correspondence between a terminal server session and a terminal server client. Accordingly, a session it typically limited to having a single instance of a specified virtual channel.

Additionally, different implementations of virtual channels have different interfaces. For example, even though the paradigm for both RDP and ICA is similar, their respective client side Application Program Interfaces ("APIs") differ. Thus, developers are prevented from writing common virtual channel implementations for both protocols.

BRIEF SUMMARY

The present invention extends to methods, systems, and computer program products for establishing and utilizing terminal server dynamic virtual channels. In some embodiments, a terminal server sends a new channel request to create a new channel between a server side plug-in at the terminal server and a client side plug-in at the client. The channel request includes the name of the plug-in.

The client receives the new channel request. The client forwards the new channel request to a listener for the plug-in having the included name. The listener creates an instance of the client side plug-in in response to receiving the new channel request. The client sends a channel accept, indicative of the listener creating the instance of the client side plug-in, to the terminal server.

The terminal server receives the channel accept. The terminal server creates an instance of the server side plug-in to communicate with the instance of the client side plug-in. A server component at the terminal server and a client component at the client negotiate to establish a dynamic virtual channel between the instance of the server side plug-in and the instance of the client side plug-in. The server component and the client component agree to use a unique identifier, different than the plug-in name, for identifying the established dynamic virtual channel.

In other embodiments, a sending computer system accesses application data form an instance of a plug-in that is to be transferred over a dynamic virtual channel. The sending computer system accessing a unique identifier corresponding to the dynamic virtual channel. The sending computer system encapsulates the unique identifier and application data within static virtual channel data for a static virtual channel.

The sending computer system further encapsulates the static virtual channel data within lower layer data corresponding to lower layers of a communication stack. The sending computer system sends the lower layer data such that the unique identifier for the dynamic virtual session and the application data are tunneled to the destination. A receiving computer system receives the lower layer data encapsulating the static virtual channel data that in turn encapsulates the unique indentifier and application data.

The receiving computer system unencapsulates the static virtual channel data from the lower layer data. The receiving computer system unencapsulates the unique identifier and application data from static virtual channel data. The receiving computer system compares the unique identifier to a channel mapping to identify the dynamic virtual channel corresponding to the data. The receiving computer system sends the application data to the plug-in corresponding to the dynamic virtual channel.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a state diagram of possible states of a terminal server dynamic virtual channel with their transitions and responses.

DETAILED DESCRIPTION

Figure 1:
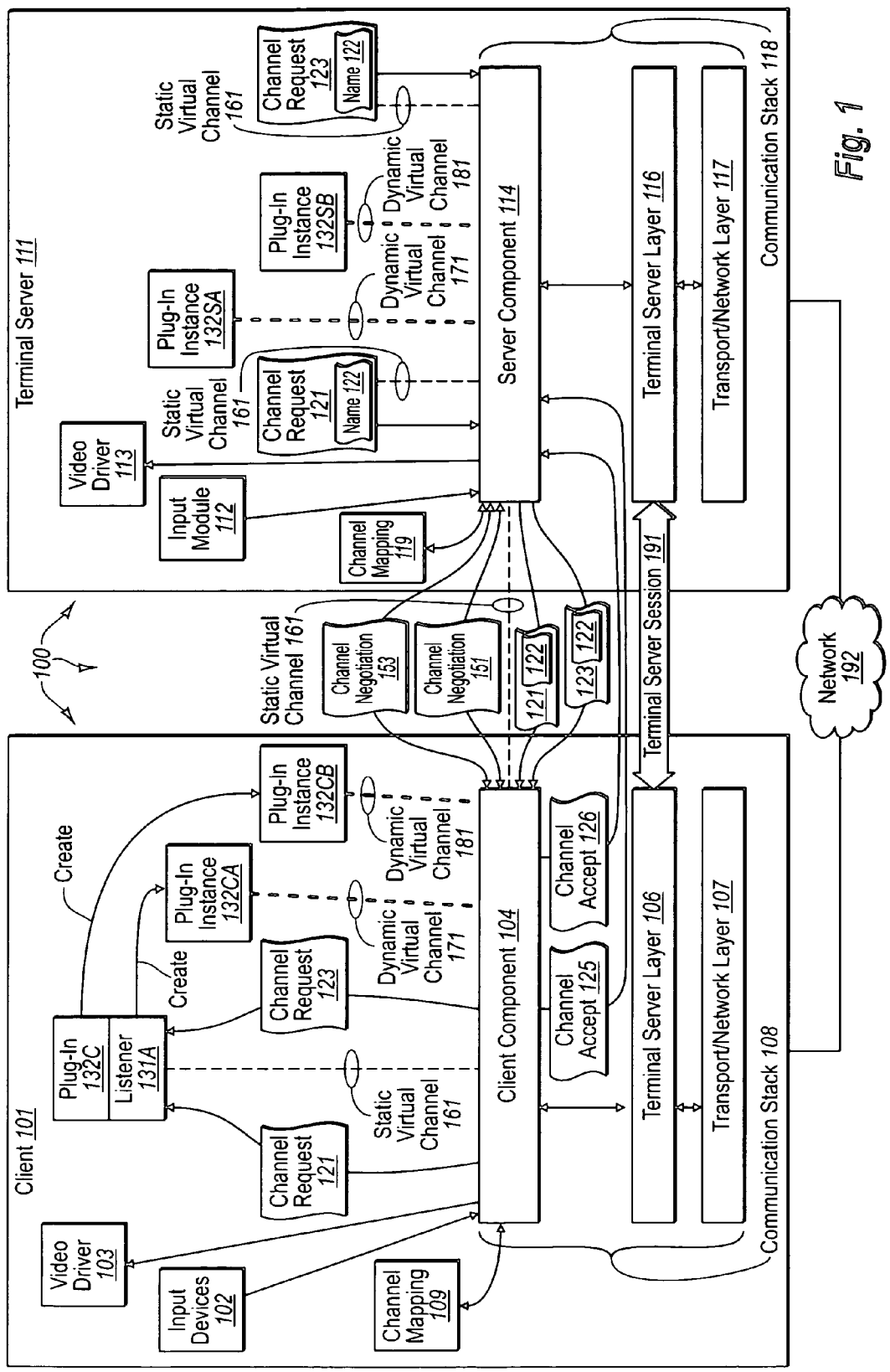
FIG. 1 illustrates an example computer architecture that facilitates establishing a terminal server dynamic virtual channel.

The present invention extends to methods, systems, and computer program products for establishing and utilizing terminal server dynamic virtual channels. In some embodiments, a terminal server sends a new channel request to create a new channel between a server side plug-in at the terminal server and a client side plug-in at the client. The channel request includes the name of the plug-in.

The client receives the new channel request. The client forwards the new channel request to a listener for the plug-in having the included name. The listener creates an instance of the client side plug-in in response to receiving the new channel request. The client sends a channel accept, indicative of the listener creating the instance of the client side plug-in, to the terminal server.

The terminal server receives the channel accept. The terminal server creates an instance of the server side plug-in to communicate with the instance of the client side plug-in. A server component at the terminal server and a client component at the client negotiate to establish a dynamic virtual channel between the instance of the server side plug-in and the instance of the client side plug-in. The server component and the client component agree to use a unique identifier, different than the plug-in name, for identifying the established dynamic virtual channel.

In other embodiments, a sending computer system accesses application data form an instance of a plug-in that is to be transferred over a dynamic virtual channel. The sending computer system accessing a unique identifier corresponding to the dynamic virtual channel. The sending computer system encapsulates the unique identifier and application data within static virtual channel data for a static virtual channel.

The sending computer system further encapsulates the static virtual channel data within lower layer data corresponding to lower layers of a communication stack. The sending computer system sends the lower layer data such that the unique identifier for the dynamic virtual session and the application data are tunneled to the destination. A receiving computer system receives the lower layer data encapsulating the static virtual channel data that in turn encapsulates the unique identifier and application data.

The receiving computer system unencapsulates the static virtual channel data from the lower layer data. The receiving computer system unencapsulates the unique identifier and application data from static virtual channel data. The receiving computer system compares the unique identifier to a channel mapping to identify the dynamic virtual channel corresponding to the data. The receiving computer system sends the application data to the plug-in corresponding to the dynamic virtual channel.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hard-wired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates establishing terminal server dynamic virtual channels. Computer architecture 100 includes client 101 and terminal server 111. Each of client 101 and terminal server 111 are connected to network 192. Network 192 can be any type of network, such as, for example, a Local Area Network ("LAN"), a Wide Area Network ("WAN"), or even the Internet. Thus, the various components at client 101 and terminal server 111 can receive data from and send data to each other, as well as other components connected to network 192. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Independent Computing Architecture ("ICA"), etc.) over network 192.

Generally, client 101 can be a computer system in communication with terminal server 111 for remote execution of applications at terminal server 111. Thus, input data (e.g., mouse and keyboard input) representing application commands is received at input device drivers 102. The input data is transferred over network 192 to terminal server 111. Input module 112 receives the input data.

Input module 112 supplies the input data to the appropriate application at terminal server 111. The application generates output data in response to the input data. Output display data for presentation at a display device is output by display driver 113. The output display data is transferred over network 192 to client 101. Video driver 103 receives the output display data and presents the output display data at a video display device associated with client 101. Thus, input is received and output presented at the client 101, while processing actually occurs terminal server 111.

Plug-ins can also be utilized to provide additional features and data formats for computer architecture 100. For example, plug-ins can be used to enhance terminal server functionality without having to modify underlying protocols, such as, for example, RDP and/or ICA, used by client 101 and terminal server 111. Generally, data transferred between instances of client side plug-ins and instances of server side plug-ins can be exchanged over virtual channels. For example, an instance of a client side plug-in can send client (input) data to instance of a server side plug-in over a virtual channel. Similarly, the instance of a server side plug-in can return server (output) data back to the instance of the client side plug-in over the virtual channel. Communication between client and server plug-ins can facilitate features such as printer redirection, clipboard redirection, port redirection, transfer of multimedia streams, transfer of Universal Serial Bus ("USB") data, etc.

At client 101, client side data (input data, plug-in data, etc.) for transfer to terminal server 111 passes down through the components of communication stack 108. Client side data is first received at client component 104. Client component 104 can mark the client side data such that server component 114 can determine how to process the client side data at server terminal server 111. For example, client component 104 can mark client side as corresponding to a specified virtual channel.

Client component 104 can then request a buffer from terminal server layer 106. In this description and in the following claims a terminal server protocol is defined as any protocol based on or that extends the ITU T.120 family of protocols, such as, for example, RDP and ICA. Terminal server layer 112 can return a buffer to client component 104. Client component 104 can fill the buffer with the client side data and return the buffer to terminal server layer 106. Terminal server layer 106 then passes the filled buffer to transport/network protocol 107. In the description and in the following claims a transport/network protocol represents is defined as any combination of transport and network protocols, such as, for example, TCP/IP. Transport/network protocol 107 places the filled buffer in a network packet and sends the network packet, over network 192, to terminal server 111.

Terminal server 111 receives the network packet and performs essentially the inverse of the operations that were performed at client 101. That is, the received network packet is passed up through the components of communication stack 118. Transport/network protocol 117 receives the network packet, removes the filled buffer from the network packet, and passes the filled buffer to terminal server layer 116. Terminal server protocol 116 removes the client side data from the buffer and passes the client side data to server component 114. Server component 114 examines the data to determine if the data is marked for input module 112 or for some other module. Based on how the data is marked, server component 114 can send the data to input module 112 or, over an appropriate virtual channel, to a plug-in.

Logically (i.e., abstracted from lower layer protocols), terminal server layer 106 and terminal server layer 116 can be viewed as establishing terminal server connection 191 between client 101 and terminal server 111.

Generally, server side data is transferred back to client 101 similarly to how client side data is transferred to terminal server 111. Likewise, client 101 can receive network packets from terminal server 111 and perform the essentially the inverse of the operations that were performed at terminal server 111.

Client component 104 and server component 114 can be configured to utilized static virtual channels and dynamic virtual channels. A static virtual channel can be established between a server side plug-in and a client side plug-in in response to a server side plug-in sending a plug-in name directly to a corresponding client side plug-in. When communication between a server side plug-in and the client side plug-in is established, the resulting virtual connection is identified by the name of the plug-in.

A dynamic virtual channel is established between an instance of a server side plug-in and an instance of a client side plug-in in response to a server side channel request (e.g., sent from a script or program) being received at a listener for the client side plug-in. In response to the channel request, the listener can spawn an instance of the client side plug-in. The client can send a channel acceptance to terminal server. The terminal server can spawn an instance of the server side plug-in in response to the acceptance.

Server and client components can then negotiate to establish a dynamic virtual channel and agree on a unique identifier to be associated with the dynamic virtual channel. The client and server can each maintain a channel mapping that maps the unique identifiers to the dynamic virtual channel. When communication including the unique identifier is received at the client or server component, the communication can be forwarded over the dynamic virtual channel to the appropriate plug-in instance.

In some embodiments, a client component and server component are configured to establish a static virtual channel between one another. For example client component 104 and server component 114 can establish static virtual channel 161. Client component 104 and server component 114 can use a specified name to reference static virtual channel 161. Client component 104 and server component 114 can then communicate over static virtual channel 161 by including the specified name in the communication. Thus, it may be that data for establishing a dynamic virtual channel between an instance of plug-in at terminal server 111 and an instance of plug-in at client 101 is communicated over static virtual channel 161.

Figure 2:
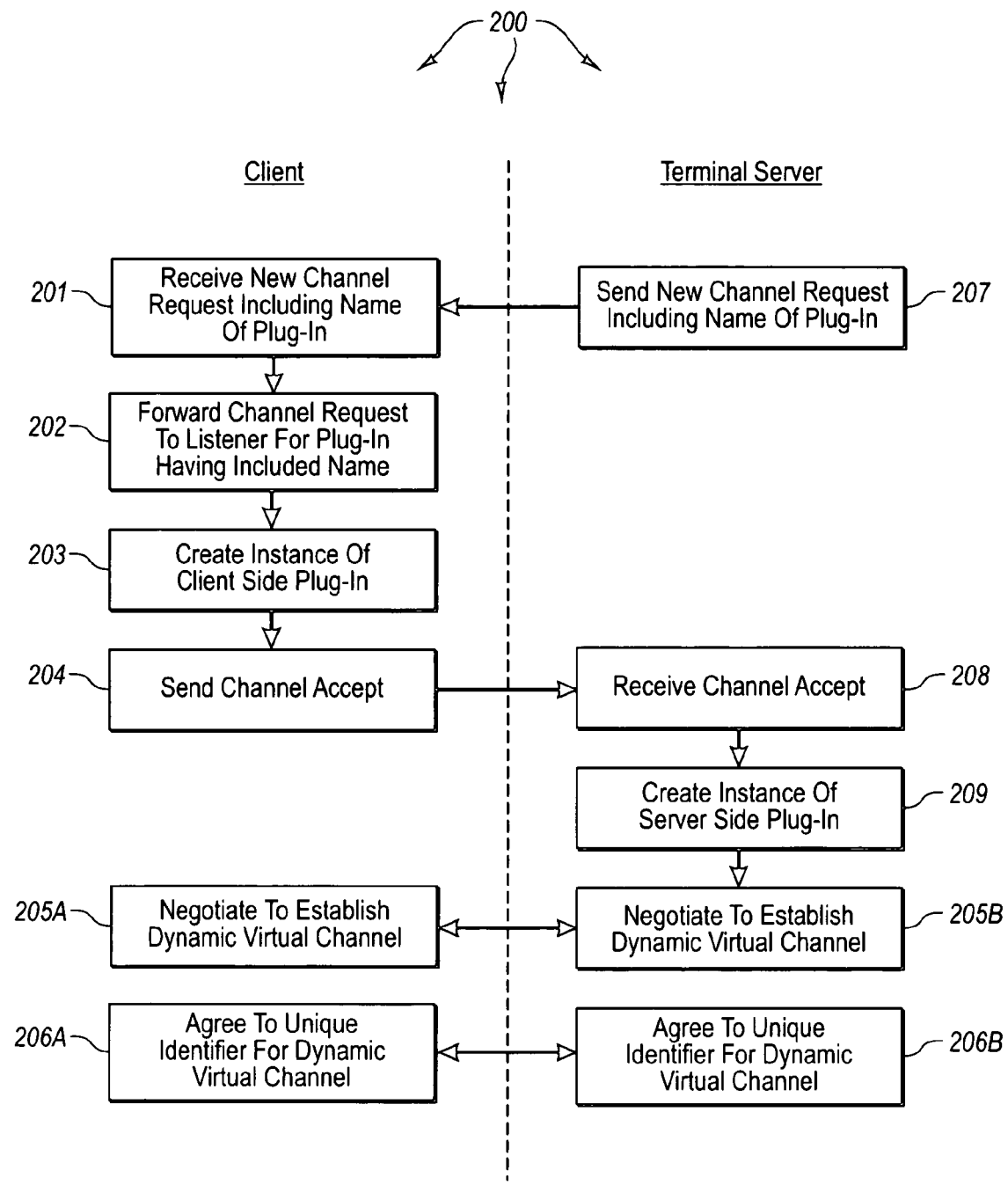
FIG. 2 illustrates a flow chart of an example method for establishing a terminal server dynamic virtual channel.

FIG. 2 illustrates a flow chart of an example method 200 for establishing a terminal server dynamic virtual channel. The method 200 will be described with respect to the components and data depicted in computer architecture 100.

Method 200 includes an act of sending a new channel request including the name of a plug-in (act 207). The new channel request can be a request by a terminal server to create a new channel between a server side plug-in at the terminal server and a client side plug-in at the client. For example, terminal server 111 can send channel request 121, including name 122, over static virtual channel 161 to client component 104. Name 122 can refer to plug-in 132C.

Method 200 includes an act of receiving a new channel request including the name of the plug-in (act 201). For example, client component 104 can receive channel request 121, including name 122.

Method 200 includes an act of forwarding the channel request to a listener for the plug-in having the included name (act 202). For example, client component 104 can determine that name 122 refers to plug-132C. In response to the determination, client component 104 can forward channel request 121 to listener 131A.

Method 200 includes an act of creating an instance of the client side plug-in(act 203). For example, listener 131A can create plug-in instance 132CA (an instance of plug-in 132C), in response to receiving channel request 121.

Method 200 includes an act of sending a channel accept message (act 204). For example, client component 104 can send channel accept 125 to terminal server 111. Channel accept 125 includes an indication of client 101 creating plug-in instance 132CA.

Method 200 includes an act of receiving a channel accept message (act 208). For example, server component 114 can receive channel accept message 125 from client 101. Channel accept message 125 indicates to server component 114 that an instance of plug-in 132C was created at client 101 (in response to channel request 121.)

Method 200 includes an act of creating an instance of a server-side plug-in (act 209). For example, terminal server 114 can create plug-in instance 132SA to communicate with plug-in instance 132CA.

Method 200 includes acts of negotiating to establish a dynamic virtual channel (acts 205A and 205B). For example, client component 104 and server component 114 can negotiate to establish dynamic virtual channel 171 between plug-in instance 132CA and plug-in instance 132SA.

Method 200 includes acts of agreeing to a unique identifier for the dynamic virtual channel (acts 206A and 206B). For example, client component 104 and server component 114 can agree to a unique identifier for dynamic virtual channel 171. Client component 104 and server component 114 can then use the unique identifier for dynamic virtual channel 171 to facilitate communication between plug-in instance 132CA and plug-in instance 132SA. The unique identifier for dynamic virtual channel 171 differs from the name of plug-in 132C. The unique identifier for dynamic virtual channel 171 can be stored in channel mapping 109 and channel mapping 119 at client 101 and terminal server 111 respectively.

Additional terminal server dynamic channels can be similarly established to other instances of plug-in 132C. For example, terminal server 111 can send channel request 124, including name 122 (the name of plug-in 132C), over static virtual channel 161 to client component 104. Client component 104 can receive channel request 121, including name 122. Client component 104 can determine that name 122 refers to plug-132C. In response to the determination, client component 104 can forward channel request 121 to listener 131A.

Listener 131A can create plug-in instance 132CB (another instance of plug-in 132C), in response to receiving channel request 123. Client component 104 can send channel accept 126 to terminal server 111, to indicate the creation of plug-in instance 132CA. Server component 114 can receive channel accept message 126 from client 101. Channel accept message 126 indicates to server component 114 that an instance of plug-in 132C was created at client 101 (in response to channel request 123.)

Terminal server 114 can create plug-in instance 132SB to communicate with plug-in instance 132CB. Client component 104 and server component 114 can negotiate to establish dynamic virtual channel 181 between plug-in instance 132CB and plug-in instance 132SB. Client component 104 and server component 114 can agree to a unique identifier for dynamic virtual channel 181 (thus differing from the unique identifier for dynamic virtual channel 171). Client component 104 and server component 114 can then use the unique identifier for dynamic virtual channel 181 to facilitate communication between plug-in instance 132CB and plug-in instance 132SB. The unique identifier for dynamic virtual channel 181 differs from the name of plug-in 132C. The unique identifier for dynamic virtual channel 171 can be stored in channel mapping 109 and channel mapping 119 at client 101 and terminal server 111 respectively.

When a component controlling communication with one side a dynamic virtual channel intends to close the dynamic virtual channel, the component communicates its intention to the other component. For example, when server component 114 intends to close dynamic virtual channel 171, server component 114 can communicate the intention to client component 104. As a result, both sides of a dynamic virtual channel can be shut down in an orderly manner.

Thus, through the use of dynamic virtual channels communication can (potentially simultaneously) occur between a plurality of different instances of a plug-in. For example, plug-ins 132CA and 132SA can exist and communicate with one another at the same time plug-ins 132CB and 132SB exist and communicate with one another. Since dynamic virtual channels 171 and 181 are identified by different unique identifiers, there is a significantly reduced chance of communication for dynamic virtual channel 171 disrupting communication for dynamic virtual channel 181 and vice versa.

Figure 3:
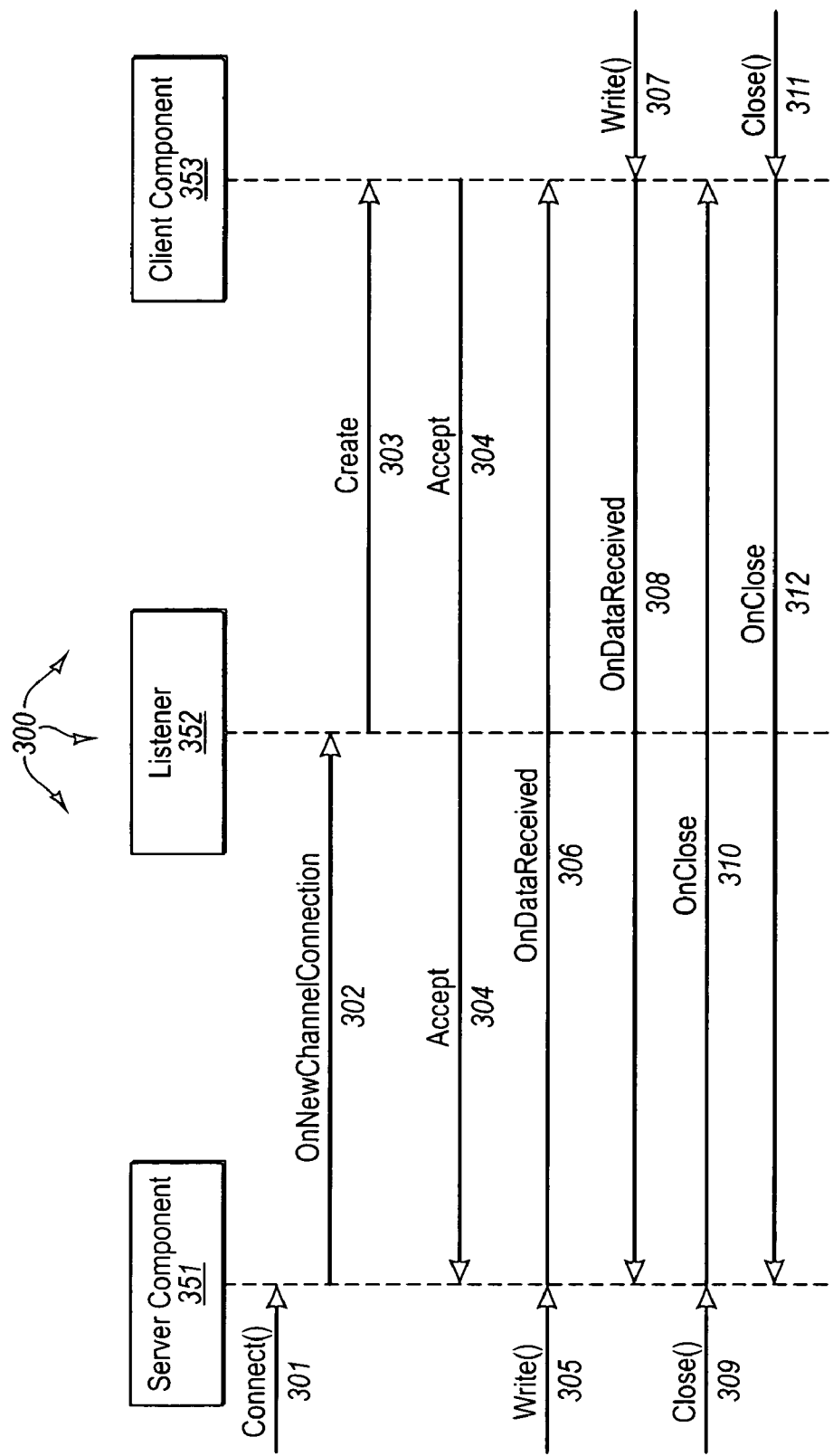
FIG. 3 illustrates a sequence diagram of the communication for opening and closing a terminal server dynamic virtual channel.

FIG. 3 illustrates a sequence diagram 300 of the communication for opening and closing a terminal server dynamic virtual channel. Server component 351 receives a connect request (e.g., a call from a script or program) (act 301). OnNewChannelConnection is transferred to listener 352 (act 302). OnNewChannelConnection indicates to listener 352 that the communication is for establishing an new dynamic channel. Listener 352 creates a new dynamic virtual channel and notifies client component 353 (act 303). Client component 353 accepts the connection and notifies terminal server component 351 (act 304).

When data is written at one side of a dynamic virtual channel it can then be transferred over the dynamic virtual channel to the other side. For example, it may server component 351 receives data for a dynamic virtual channel (act 305). OnDataReceived can then transfer the dynamic virtual channel data across the to the client component (act 306). Similarly, it may that client component 353 receives data for the dynamic virtual channel (act 306). OnDataReceived can then transfer the dynamic virtual channel data to the server component (act 306).

When one side of a dynamic virtual channel intends to close the dynamic virtual channel it can notify the other side. For example, it may that server component 351 receives a channel close command for a dynamic virtual channel (act 309). OnClose can then transfer the intention to close the dynamic virtual channel to client component 353 (act 310). Similarly, it may that client component 353 receives a channel close command for the dynamic virtual channel (act 311). OnClose can then transfer the intention to close the dynamic virtual channel to server component 351 (act 312).

FIG. 4 illustrates a state diagram 400 of possible states of a terminal server dynamic virtual channel with their transitions and responses. States 402 depicts various states (initialized, opening, open, closing, and closed) that can occur for a dynamic virtual channel. Events 401 depicts various events (CreateFile, WriteFile or Data, CloseFile, Open Packet Success, Open Packet Fail, and Close Packet) that can occur over a dynamic virtual channel.

The entries of state diagram 400 depict the results of events occurring when a dynamic virtual channel is in different states. For example, when a CloseFile event is received during an open state, the dynamic virtual channel initiates closing and sends a close packet. Some events are not applicable (N/A) to a dynamic virtual channel in some states. For example, a WriteFile event is not applicable to a closed dynamic virtual channel. Some events are ignored when a dynamic virtual channel is in some states. For example, an Open Packet Success event is ignored when a dynamic virtual channel is closed.

Figure 5:
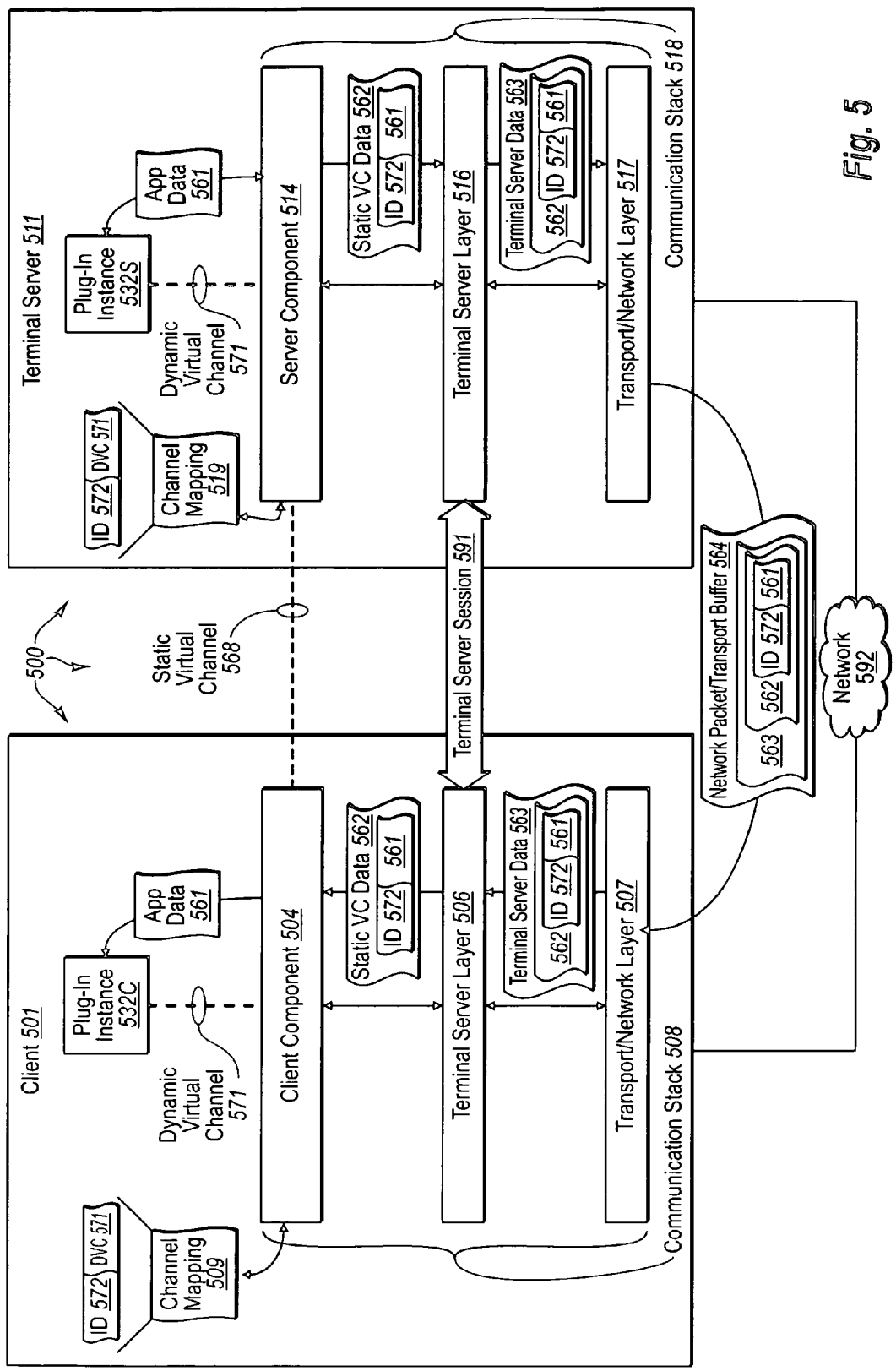
FIG. 5 illustrates an example computer architecture that facilitates transferring data over a terminal server dynamic virtual channel.

FIG. 5 illustrates an example computer architecture 500 that facilitates transferring data over a terminal server dynamic virtual channel. As depicted, computer architecture includes client 501 and terminal server 511 connected to network 592. Generally, the components of client 501 are configured similar to the components of client 101. Client component 504, terminal server layer 506, transport/network layer 507 are included in communication stack 508. Likewise, components of terminal server 511 are configured similar to the components of terminal server 111. Server component 514, terminal server layer 516, and transport/network layer 517 are included in communication stack 518.

Logically (i.e., abstracted from lower layer protocols), terminal server layer 106 and terminal server layer 116 can be viewed as establishing terminal server connection 191 between client 101 and terminal server 111. Additionally, client component 504 and server component 514 can establish static virtual channel 568, and use a specified name to reference static virtual channel 568. Client component 504 and server component 514 can then communicate over static virtual channel 568 by including the specified name in the communication.

Through previous communication between client 501 and terminal server 511 (e.g., in accordance with method 200) dynamic virtual channel 571 is established between plug-in instance 532C and plug-in instance 532S. During establishment of dynamic virtual channel 571, client component 504 and server component 514 can agree to unique identifier ID 572 for dynamic virtual channel 571. Client 504 can store a mapping of ID 572 to dynamic virtual channel 571 in channel mapping 509. Similarly, terminal server 511 terminal server 511 can store a mapping of ID 572 to dynamic virtual channel 57 1 in channel mapping 519.

Figure 6:
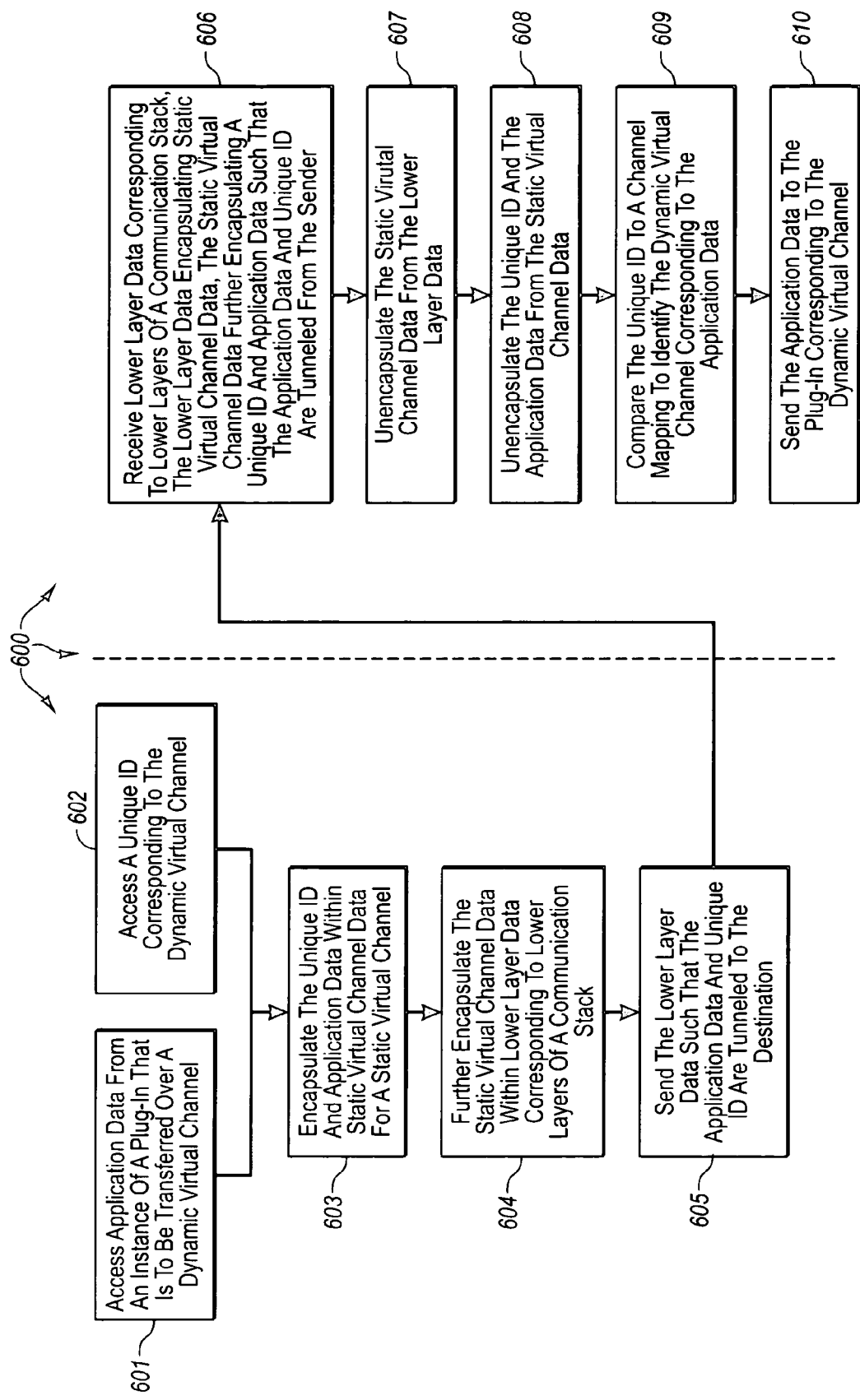
FIG. 6 illustrates a flow chart of an example method for transferring data over a terminal server virtual channel.

FIG. 6 illustrates a flow chart of an example method 600 transferring data over a terminal server virtual channel. The method 600 will be described with respect to components and data in computer architecture 500.

Method 600 includes an act of accessing application data from an instance of a plug-in that is to be transferred over a dynamic virtual channel (act 601). For example, server component 514 can access application data 561 from plug-in instance 571. Method 600 includes an act of accessing a unique ID corresponding to the dynamic virtual channel (act 602). For example, server component 514 can access ID 572 from channel mapping 519.

Method 600 includes an act of encapsulating the unique ID and application data within static virtual data for a virtual channel (act 603). For example, server component 514 can encapsulate ID 572 and application data 561 within static virtual channel 562. Static virtual channel data can include the name of static virtual channel Method 600 includes an act of further encapsulating the static virtual channel data within lower layer data corresponding to lower layers of a communication static (ac 604). For example, terminal server layer 516 can encapsulate virtual channel data 562 in terminal server data 563 (e.g., RDP data). Transport/network layer 517 can further encapsulate terminal server data 563 within network packet/transport buffer 564 (e.g., TCP/IP data).

Method 600 includes an act of sending the lower layer data such that the application data and the unique ID are tunneled to the destination (act 605). For example, transport/network layer 517 can send network packet/transport buffer 564 such that ID 572 and application data 561 are tunneled to transport/network layer 507.

Method 600 includes an act of receiving lower layer data corresponding to lower layers of a communication stack (act 606). The lower layer data encapsulating static virtual channel data. The static virtual channel data further encapsulating a unique ID and application such that the application and unique ID are tunneled from the sender. For example, transport/network layer 507 can receive network packet/transport buffer 564. Network packet/transport buffer 564 encapsulates terminal server data 563, which further encapsulates static virtual channel data 562. Static virtual channel data further encapsulates ID 572 and application data 561 such that ID 572 and application data 561 are tunneled from transport/network layer 517.

Method 600 includes an act of unencapsulating the static virtual channel data from the lower layer data (act 607). For example, transport/network layer 507 can unencapsulate terminal server data 563 from network packet/transport buffer 564. Terminal server layer 506 can further unencapsulate static virtual channel data 562 form terminal server data 562.

Method 600 includes an act of unencapsulating the unique ID and the application data form the static virtual channel data (act 608). For example, client component 504 can unencapsulate ID 572 and application data 561 from static virtual channel data 562. Method 600 includes an act of comparing the unique ID to a channel mapping to identify the dynamic virtual channel corresponding to the application data (act 609). For example, client component 504 can compare id ID 572 to channel mapping 509. From the comparison, client component 504 can identify that application data 561 corresponds to dynamic virtual channel 571.

Method 600 includes an act of sending the application data to the plug-in corresponding to the dynamic virtual channel (act 610). For example, client component 504 can send application data 561 to plug-in instance 532C.

When appropriate, application data from plug-in instance 532C can be sent to plug-in instance 532S in a manner similar (or identical) to method 600. Accordingly, application data and unique IDs associated with a dynamic virtual channel can be encapsulated within static virtual channel data for tunneling between a client and terminal server and vice versa.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a terminal server comprising a server side plug-in, a method for establishing a dynamic virtual channel between the server side plug-in and a corresponding client side plug-in at a client, both of the server side plug-in and the corresponding client side plug-in being associated with a common plug-in name, the method comprising:

an act of establishing, over a terminal server session, a static virtual channel between the server side plug-in at the terminal server and the corresponding client side plug-in at the client by at least sending the common plug-in name of the client side plug-in to the client side plug-in, wherein the static virtual channel is identifiable by the common plug-in name of the client side plug-in and wherein the common plug-in name of the client side plug-in is also usable by a server component at the terminal server to communicate with a client component at the client via the static virtual channel;

an act of sending a new channel request over the terminal server session via the static virtual channel to create a new dynamic virtual channel between the server side plug-in at the terminal server and the corresponding client side plug-in at the client, the new channel request including the common plug-in name of the client side plug-in;

an act of receiving a channel accept from the client, the channel accept indicative of a listener for the client side plug-in receiving the channel request and creating an instance of the client side plug-in;

an act of creating an instance of the server side plug-in to communicate with the instance of the client side plug-in;

an act of the server component at the terminal server negotiating with the client component at the client to establish the new dynamic virtual channel over the terminal server session between the instance of the server side plug-in and the instance of the client side plug-in; and an act of the server component agreeing to a unique identifier for the established new dynamic virtual channel, the unique identifier usable by the server component to forward communication from the instance of the server side plug-in to the instance of the client side plug-in via the new dynamic virtual channel, the unique identifier differing from the common plug-in name of the client side plug-in.

2. The method as recited in claim 1, wherein the terminal server session is one of an RDP session or an ICA session.

3. The method as recited in claim 1, wherein the act of receiving a channel accept from the client comprises an act of receiving a channel accept message over the terminal server session.

4. The method as recited in claim 1, wherein the act of a server component at the terminal server negotiating with a client component comprises an act of negotiating over the static virtual channel.

5. The method as recited in claim 1, further comprising:
an act of sending a close command to the client to indicate that the terminal server intends to close the dynamic virtual channel.

6. The method as recited in claim 1, further comprising:
an act of sending a close command to the terminal server to indicate that the client intends to close the dynamic virtual channel.

7. The method as recited in claim 1, wherein forwarding communication from the instance of the server side plug-in to the instance of the client side plug-in via the new dynamic virtual channel further comprises forwarding communication via the static virtual channel.

8. The method as recited in claim 7, further comprising identifying the new dynamic virtual channel with the unique identifier and the static virtual channel with the common plug-in name of the client side plug-in.

9. The method as recited in claim 1, wherein forwarding communication from the instance of the server side plug-in to the instance of the client side plug-in via the new dynamic virtual channel facilitates at least one of printer redirection, clipboard redirection, and transfer of Universal Serial Bus data.

10. The method as recited in claim 1, further comprising:
an act of sending another new channel request over the terminal server session via the static virtual channel to create another new dynamic virtual channel between the server side plug-in at the terminal server and the corresponding client side plug-in at the client, the another new channel request including the common plug-in name of the client side plug-in;
an act of receiving another channel accept from the client, the another channel accept indicative of a listener for the client side plug-in receiving the channel request and creating another instance of the client side plug-in;
an act of creating another instance of the server side plug-in to communicate with the another instance of the client side plug-in;
an act of the server component at the terminal server negotiating with the client component at the client to establish the another new dynamic virtual channel over the terminal server session between the another instance of the server side plug-in and the another instance of the client side plug-in; and
an act of the server component agreeing to another unique identifier for the established another new dynamic virtual channel, the another unique identifier usable by the server component to forward communication from the another instance of the server side plug-in to the another instance of the client side plug-in via the another new dynamic virtual channel, the another unique identifier differing from both the common plug-in name of the client side plug-in and the unique identifier for the new dynamic virtual channel.

11. The method as recited in claim 1, further comprising sending another channel request, thereby establishing another dynamic virtual channel between the server side plug-in at the terminal server and the corresponding client side plug-in at the client, the another dynamic virtual channel identified by another unique identifier that is different from the unique identifier for the new dynamic virtual channel.

12. At a client comprising a client side plug-in, a method for establishing a dynamic virtual channel between the client side plug-in and a corresponding server side plug-in at a terminal server, both of the client side plug-in and the corresponding server side plug-in being associated with a common plug-in name, the method comprising:

an act of establishing, over a terminal server session, a static virtual channel between the client side plug-in at the client and the corresponding server side plug-in at the terminal server by at least receiving the common plug-in name of the client side plug-in from the server side plug-in, wherein the static virtual channel is identifiable by the common plug-in name of the client side plug-in and wherein the common plug-in name of the client side plug-in is also usable b a client component at the client to communicate with a server component at the terminal server via the static virtual channel;

an act of receiving a new channel request over the terminal server session via the static virtual channel to create a new dynamic virtual channel between the client side plug-in at the client and the corresponding server side plug-in at the terminal server, the new channel request including the common plug-in name of the client side plug-in;

an act of forwarding the new channel request to a listener for the plug-in having the included name;

an act of the listener creating an instance of the client side plug-in, in response to receiving the new channel request;

an act of sending a channel accept to the terminal server, the channel accept indicative of the listener creating the instance of the client side plug-in;

an act of the client component negotiating with the server component at the terminal server to establish the new dynamic virtual channel over the terminal server session between the instance of the client side plug-in and a corresponding instance of the server side plug-in at the terminal server; and an act of the server component agreeing to a unique identifier for the established new dynamic virtual channel, the unique identifier usable by the client component to forward communication from the instance of the client side plug-in to the instance of the server side plug-in via the new dynamic virtual channel, the unique identifier differing from the common plug-in name of the client side plug-in.

13. The method as recited in claim 12, wherein the terminal server session is one of an RDP session or an ICA session.

14. The method as recited in claim 12, wherein the act of sending a channel accept from to the terminal server comprises an act of sending a channel accept message over the terminal server session.

15. The method as recited in claim 12, wherein the act of client component at the client negotiating with a server component at the terminal server comprises an act of negotiating over the static virtual channel.

16. A computer storage device storing computer executable instructions that when executed by a processor perform the method of claim 1.

17. A computer storage device storing computer executable instructions that when executed by a processor perform the method of claim 12.

* * * * *